United States Patent

[11] 3,620,944

[72] Inventors Keiko Tanito
Sakai-shi;
Norio Kato, Sakai-shi; Shosaku Kinoshita, Sakai-shi; Masahiro Kinoshita, Asahi-ku, Osaka; Tsuyoshi Sunada, Amagasaki-shi, all of Japan
[21] Appl. No. 712,386
[22] Filed Mar. 12, 1968
[45] Patented Nov. 16, 1971
[73] Assignee Osaka Prefecture
Osaka, Japan
[32] Priority Sept. 9, 1967
[33] Japan
[31] 42/58071

[54] PROCESS OF PURIFYING WATER BY IRRADIATING IT
7 Claims, No Drawings
[52] U.S. Cl. .................................. 204/158, 204/157.1
[51] Int. Cl. ............................................ B01j 1/10
[50] Field of Search ..................................... 204/157.1 HE, 158 HE; 210/1

[56] References Cited
UNITED STATES PATENTS
3,147,213   9/1964   Byron et al. .............. 204/157.1
OTHER REFERENCES
Allen, Chemical Effects of Ionizing Radiation on Simple Inorganic Compounds & Aqueous Solutions, pages 1 and 9 & cover sheet

*Primary Examiner*—Howard S. Williams
*Attorney*—Beveridge & De Grandi

ABSTRACT: A process for purifying polluted water by irradiating it with ionizing radiation. Water polluted with parathion, phenyl mercuric acetate or methyl mercuric chloride can be purified by irradiating it with ionizing radiation. The amount of irradiations required depends upon the concentration of polluted water to be purified. It is required about 1,000,000 rads to reduce such a high concentration of polluted water as industrial waste water; about 100,000 to 500,000 rads to reduce a medium concentration of polluted water such as sewerage; about 5,000 to 50,000 rads to reduce a low concentration of polluted water such as drinking water.

PROCESS OF PURIFYING WATER BY IRRADIATING IT

This invention relates to a process of purifying polluted water by irradiating it with ionizing radiation. A purpose of this invention is to decompose various water-polluting poisonous substances into nonpoisonous ones by irradiating it with radiation.

An important purpose of water treatment has hitherto been, aside from treating a special water, to kill microbes which carry infectious diseases or bacteria which spoil substances or microbes which cause food poisoning contained in the water.

With a remarkable development of the industry and a consequential rapid concentration of population, there has been an increasing flow of factory waste and household sewerage into raw water. As there are not sufficient facilities for treating the factory waste water and household sewerage, the raw water is chemically polluted to a great extent. And so it has now become another important purpose to treat the chemically polluted water effectively. But important methods of treating water now employed are, take, for example, methods of treating drinking water, only three systems of sedimentation, filtration and chlorination. Depending upon chemically polluted substances contained in water, much of these substances remain untreated by these conventional treatments and is carried to household water supply at a terminal without being treated at all.

With the conventional water treatment, it is impossible to treat effectively some chemical substances contained in water, and such substances are carried to drinking water at the terminal and pollute it to a great extent. It is the present status that such a polluting tendency has been increasing both quantitatively and qualitatively. In view of the above, it is feared that such a tendency is detrimental to the persons living in the whole water supply districts.

This invention tries to eliminate the above-mentioned disadvantages by making use of ionizing radiation. The foregoing and other objects and features of this invention will be apparent from the following examples according to this invention. But it must be borne in mind that they are illustrative of the process of this invention and of the results obtained thereby, but are not to be considered as limiting.

EXAMPLE 1. IRRADIATING PARATHION

As parathion is a strong agent for destroying insects, it is widely used as agricultural chemicals. As it is a water-soluble agent, it flows into raw water. As it is a very poisonous substance, it is designated as a special poisonous substance.

It is now stipulated that a presence of parathion in water should be null, but there is a tendency that its contents is water are increasing with an increasing amount of it being used year after year. It is also said that it is secretly studied, as a war strategy, to put parathion or a member of its family into a source for drinking water in order to stop temporarily the activities of persons depending upon the drinking water from such source. Hence, it is absolutely necessary to establish a technology to handle such a chemical war weapon effectively.

Regarding the conventional treating methods which have been hitherto proposed, there is no effective way of treating parathion at high concentrations except a method of putting an excessive amount of alkali into water containing it. In the case of water containing a lower concentration of parathion there is a method of putting active carbon into such a water and let the carbon absorb such chemicals. In the former case, it is not desirable to put an excessive amount of alkali into the water, because this will bring about an increasing amount of salts in it. In the later case, if the water also contains some other polluting substance, the adsorptive power of the carbon is so much weakened by the coaction between the two chemicals. Hence, this latter case has also a drawback that a great amount of active carbon must be put into the water.

When gamma rays from Co-60 irradiated water containing parathion, they destroyed it. For example, with a concentration of 1 p.p.m. of parathion, about its 60 percent was destroyed by the action of irradiation of 5,000 rads; 80 percent by 10,000 rads. With a concentration of 0.1 p.p.m. parathion, more than its 99 percent was destroyed by 10,000 rads. With its lower concentrations, the rate of its destruction was further increased.

EXAMPLE 2. IRRADIATING PHENYL MERCURIC ACETATE (PMA)

Phenyl mercuric acetate is an agricultural chemical used for preventing or eradicating a rise plant disease. But this agricultural chemical penetrates into rice, and so the mercury in this agricultural chemical is carried into the bodies of the Japanese who have a habit of feeding on rice, which has become a serious health problem of the people. What is more, as phenyl mercuric acetate is soluble in water, it is liable to flow from a rice field into raw water and finally into our drinking water. When water containing such chemicals is irradiated with gamma rays from Co-60, they are decomposed into an inorganic mercury and produces a water-soluble yellow brownish floc. Such a floc can be rapidly turned into a sediment by means of sedimentation with coagulation by the use of coagulants such as aluminum sulfate. Such a floc is produced when PMA at a 100 p.p.m. concentration is irradiated by more than 100,000 rads; when 1,000 p.p.m. by more than 10,000 rads. When water containing PMA at a 10 p.p.m. concentration was irradiated by 10,000 rads, 40 percent of it was destroyed; when by 500,000 rads, 80 percent of it was destroyed. In the case of water containing PMA at concentrations below the above-mentioned concentrations, its destruction was further increased. What is more, in the case of low concentrations, such a polluted water does not become cloudy by irradiation. But when said polluted water was treated by a rapidly sedimentating method which employs coagulants such as aluminum sulfate it was noticed that the mercury itself in the supernatant water was decreased.

EXAMPLE 3. IRRADIATING METHYL MERCURIC CHLORIDE

Methyl mercuric chloride is a member of low alkyl mercuric compounds and is notorious for causing a so-called "Minamata disease" in Japan. When waste water containing methyl mercuric chloride from an acetaldehyde plant flows into a river and is taken by fishes or shells, it will be concentrated in their bodies. And when such fishes or shells are taken by man, he will be attached by such severe symptoms of brain disease as cannot be seen in the cases of other inorganic mercuries or high alkyl mercuric compounds. As may be seen from our above examples, there is a very strong possibility that such waste water flows into a river which is a source for our drinking water. And a technology which is capable of treating such a waste water is much desired. But the existing technology is unable to offer an effective method of treating it. There is no doubt a method of adsorbing and eliminating methyl mercuric chloride by means of active carbon. But this active carbon method has serious drawbacks as mentioned above. In view of the above, this invention contributes to solving the above problems.

When water containing methyl mercuric chloride at a 1 p.p.m. concentration was irradiated by 10,000 rads of gamma rays from Co-60, 98 percent of it was reduced. In the case of 100 p.p.m., 98 percent of it was reduced by 1,000,000 rads. In the case of 1,000 p.p.m. 50 percent by 1,000,000 rads; 97 percent by 10,000,000 rads. When concentrations are 100 p.p.m. or over, a white precipitate was produced by the irradiation of 10,000 rads or over. This is an inorganic mercury. A rapid sedimentation with coagulants treatment after the irradiation did not show such a remarkable effect as in the previous example of PMA.

As described in the above examples in detail, when water containing phenyl, parathion, phenyl mercuric acetate, or methyl mercuric chloride was irradiated by radiation, its contents were destroyed. In the case of water containing phenyl mercuric acetate, there was a case in which clear water was turned by irradiation into water containing an insoluble compound. But this insoluble compound could be either sedimentated by gravity or merely standing or eliminated by a rapidly sedimentation and filtering method. It was possible, therefore, to obtain purified water by the above filter method.

After irradiating water containing such poisonous substances, it was sedimented and filtered. The water so obtained was given to mice for a period of three months. But no remarkable toxic effects were found.

The above-mentioned water was also given to goldfishes which were more susceptible to these poisonous substances and the gold fishes were tested whether toxic effects had been produced in their bodies. The tests on the gold fishes corresponded to the test results which showed the lowering of the concentration of such poisonous substance by irradiation. Such an irradiated water did not produce any poisonous substance which might result from the irradiation.

In the above examples gamma rays from Co-60 were cited as a source of radiation. But it is possible to obtain the similar effects by the irradiation of X-rays or accelerated electron beams.

The amount of irradiations required depends upon the concentration of polluted water to be reduced. It is required a great quantity of something like 1,000,000 rads to reduce such a high concentration of polluted water as industrial waste water; a moderate quantity of about 100,000 to 500,000 rads to reduce a medium concentration of polluted water such as sewerage; a small quantity of about 5,000 to 50,000 rads to reduce a low concentration of polluted water such as drinking water.

As has been described above, water polluted by one or more of a group of parathion, phenyl mercuric acetate and methyl mercuric chloride can be purified by irradiating a proper amount of radiation, and the achievement of such an irradiation is really excellent, and this effective means contribute greatly to the solution of water pollution problem.

We claim:

1. A process for water purification which comprises radiating water polluted with at least one of a member selected from the group consisting of parathion, phenyl mercuric acetate and methyl mercuric chloride by contacting the water with ionizing radiations for a sufficient period of time to destroy a sufficient amount of said water polluting substances to thereby purify said water.

2. A process as claimed in claim 1 in which water is polluted with parathion.

3. A process as claimed in claim 1 in which water is polluted with phenyl mercuric acetate.

4. A process as claimed in claim 1 in which water is polluted with methyl mercuric chloride.

5. A process in accordance with claim 1 which further includes the additional step of removing the substances resulting from irradiation of said water by sedimenting and filtering the sediments.

6. A process in accordance with claim 1 wherein said ionizing radiations are selected from the group consisting of gamma rays, X-rays, and accelerated electron beams.

7. A process in accordance with claim 1 wherein said dosage of ionizing radiation is in an amount of from about 5,000–1,000,000 rads.

* * * * *